Patented Apr. 9, 1940

2,196,607

UNITED STATES PATENT OFFICE 2,196,607

PROCESS FOR THE PREPARATION OF ORGANIC DISULPHIDES

Roger A. Mathes, Akron, Ohio, assignor to The B. F. Goodrich Company, New York, N. Y., a corporation of New York No Drawing. Application November 18, 1938, Serial No. 241,200

9 Claims. (Cl. 260—302)

This invention relates to the preparation of organic disulphides, and has specific reference to the oxidation of mercaptoalkylthiazoles.

The objects of the invention are the manufacture of di(alkylthiazyl) disulphides of high purity, in good yields and at an economical cost.

These objects are attained according to my invention by causing a mercaptoalkyl thiazole to react with a hypochlorite, whereupon an oxidation takes place resulting in the formation of a di(alkylthiazyl) disulphide. The following equation is illustrative of the reaction as it is believed to take place:

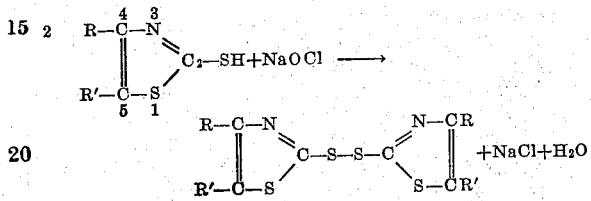

where R and R' represent like or unlike radicals which may be hydrogen atoms, alkyl groups, aryl groups, substituted aryl groups, alkoxy groups, carbalkoxy groups, phenylamino groups, ketoanilino groups, etc. R and R' may also be joined together to form an alicyclic ring.

The preferred method of practicing the invention consists in suspending a mercaptoalkylthiazole in aqueous medium and adding thereto a hypochlorite.

Specific reaction conditions are necessary to obtain satisfactory results when employing my process. A common procedure in the formation of an organic disulphide by the oxidation of a sulphydryl compound is to carry the oxidation out while dissolved in an alkaline solution. In my process, the mercaptoalkylthiazoles are preferably present as a suspension. For best results, such a suspension is formed by dissolving the mercapto body in an alkali and precipitating by the addition of an acid, as sulphuric acid. By this procedure, the mercaptoalkylthiazole is obtained as a very fine suspension, and a more complete oxidation is insured than when using a mechanically ground powder. Furthermore, the aqueous suspension is preferably maintained in an alkaline condition. The yield is somewhat increased when the alkalinity is furnished by a selected mild alkali, as sodium carbonate, rather than an alkali metal hydroxide. For the same reason, the hypochlorite solution to be used in the oxidation is carefully prepared to avoid an unnecessary excess of free alkali. In the case of alkali metal hypochlorites, a small amount of free alkali is however necessary to insure reasonable stability. While water is usually employed as a diluent for carrying out the oxidation, organic solvents may also be used. In general, mercaptoalkylthiazoles are appreciably soluble in organic solvents while the di(alkylthiazyl) disulphides are even more soluble. The process is therefore somewhat more involved and in addition would require recovery of the oxidation product from solution as well as recovery of the organic solvent. The oxidation products are not appreciably soluble in water, and the water filtrate, containing the by-product inorganic salt formed in the reaction, is discarded.

The use of oxidation catalysts, as nickel and cobalt salts, is not necessary. Hypochlorite offers an oxidizing agent that may be used at low temperatures which is, in general, desirable when oxidizing mercaptoalkylthiazoles. The oxidation products in many cases are low melting compounds.

Alkali metal hypochlorites, particularly sodium hypochlorites, give excellent results in my process. They may be readily prepared at a low cost. Satisfactory results may also be obtained with many other hypochlorites, as for example calcium hypochlorite. Esters of hypochlorous acid, as tertiary butyl hypochlorite, may be used if desired. Hypobromites and hypoiodides give results similar to those obtained with hypochlorites but are of minor importance due to their comparatively high cost.

Mercaptoalkylthiazoles which may be oxidized to the corresponding disulphides by my process, include, among others, 2-mercaptothiazole; 2-mercapto 4,5-dimethyl thiazole; 2-mercapto 4-ethyl thiazole; 2-mercapto 4-methyl thiazole; 2-mercapto 4-phenyl thiazole; 2-mercapto 4,5-cyclotetramethylene thiazole; 2-mercapto 4-methyl 5-ethyl thiazole; 2-mercapto 4-methyl 5-carbethoxy thiazole; 2-mercapto 4-tolylthiazole 2-mercapto 4-anilino thiazole.

Example 1

25 lbs. of 2-mercapto 4,5-dimethylthiazole (M. P. 157°–160° C.) are dissolved in an alkali solution prepared by dissolving 8 lbs. of sodium hydroxide in 8.5 gal. of water. This solution is filtered to remove a small amount of insoluble material. While stirring, 20% sulphuric acid is added until the slurry of precipitated mercaptothiazole is slightly acid. During the acidification, 6 gal. of water and 40 lbs. of ice are added for the purpose of dilution. The slurry is now made alkaline by the addition of 0.5 lb. sodium carbonate.

While agitating the slurry, 70 lbs. of a 15% solution of sodium hypochlorite are added slowly, 90 minutes being required for the addition. A temperature range of 24°–29° C. is maintained by the occasional addition of crushed ice. During the addition of the hypochlorite, the slurry is gradually seen to change in appearance from a white, thick reaction mixture to a light brown precipitate not as finely-divided.

After standing several hours the product is filtered off, washed and dried at room temperature. The dry weight is 21.4 lbs., representing an 86.3% yield. The melting point of the di(4,5-dimethylthiazyl) disulphide is 42°–46° C.

*Example 2*

72.5 g. of 2-mercapto 4,5-dimethylthiazole are dissolved in an alkali solution prepared by dissolving 22 g. of sodium hydroxide in 500 cc. of water. Dilute hydrochloric acid is added while stirring to precipitate the mercaptothiazole as a finely-divided suspension. The suspension is made alkaline by the addition of a small amount of sodium carbonate. The oxidizing agent is prepared by dissolving 48 g. of bleaching powder (70% available chlorine) in 200 cc. water. The insoluble material is removed by filtration. The bleaching powder solution is added to the suspension of mercaptothiazole with agitation, over a period of 75 minutes, while maintaining a temperature range of 14°–31° C. After standing several hours, the thin slurry of light brown di(4,5-dimethyl-thiazyl) disulphide is filtered off, washed and dried. The dryweight is 63 g. representing an 87.5% yield. The melting point is 44°–47° C.

*Example 3*

29 g. of 2-mercapto 4-ethyl thiazole (M. P. 78°–80° C.) are dissolved in 8.8 g. of sodium hydroxide and 300 cc. of water. 20% sulphuric acid is added with stirring to precipitate the mercaptothiazole. The slightly acid suspension is brought to an alkaline condition by the addition of a small amount of sodium bicarbonate.

While agitating the suspension, 62 cc. of a 15% solution of sodium hypochlorite are added over a period of 30 minutes, while maintaining a temperature of 15°–20° C. After standing several hours, the precipitate of di(4-ethyl thiazyl) disulphide is filtered off, washed and dried. The dry weight is 26.2 g. representing a 91% yield. The melting point is 36°–39° C.

Hypochlorites are shown, in the data presented, to have several distinct advantages in the oxidation of mercaptoalkyl thiazoles to the corresponding di(alkylthiazyl) disulphides. Sodium hypochlorite, as well as bleaching powder, are inexpensive materials. A nearly quantitative conversion of mercaptothiazoles to disulphides is obtained. The process is operative at a wide temperature range making possible the isolation of low melting products as solids. The use of oxidation catalysts is not necessary.

I claim:

1. A process for preparing a di(alkyl thiazyl) disulphide which comprises oxidizing the corresponding mercapto alkyl thiazole in an aqueous medium containing alkali in a quantity insufficient to dissolve the mercapto compound, with a hypochlorite in a quantity not substantially in excess of the stoichiometric equivalent required to remove one hydrogen from each molecule.

2. The process of claim 1 in which the hypochlorite is an alkali metal hypochlorite.

3. A process for preparing a di(alkyl thiazyl) disulphide which comprises suspending the corresponding mercapto alkyl thiazole in water maintained alkaline by an alkali metal salt of a weak acid in a quantity insufficient to dissolve the mercapto compound, oxidizing the mercapto compound at approximately room temperature with an alkali metal hypochlorite in a quantity not substantially in excess of the stoichiometric equivalent required to remove one hydrogen from each molecule, and filtering off the product.

4. A process for preparing di(4,5-dimethyl thiazyl) disulphide which comprises oxidizing 2-mercapto 4,5-dimethyl thiazole in an aqueous medium containing alkali in a quantity insufficient to dissolve the mercapto compound, with an alkali metal hypochlorite in a quantity not substantially in excess of the stoichiometric equivalent required to remove one hydrogen from each molecule.

5. A process for preparing di(4,5-dimethyl thiazyl) disulphide which comprises suspending 2-mercapto 4,5-dimethyl thiazole in water maintained alkaline by a sodium salt of a weak acid in a quantity insufficient to dissolve the mercapto compound, oxidizing the mercapto compound at approximately room temperature with sodium hypochlorite in a quantity not substantially in excess of the stoichiometric equivalent required to remove one hydrogen from each molecule, and filtering off the product.

6. A process for preparing di(4-ethyl thiazyl) disulphide which comprises oxidizing 2-mercapto 4-ethyl thiazole in an aqueous medium containing alkali in a quantity insufficient to dissolve the mercapto compound, with an alkali metal hypochlorite in a quantity not substantially in excess of the stoichiometric equivalent required to remove one hydrogen from each molecule.

7. A process for preparing di(4-ethyl thiazyl) disulphide which comprises suspending 2-mercapto 4-ethyl thiazole in water maintained alkaline by a sodium salt of a weak acid in a quantity insufficient to dissolve the mercapto compound, oxidizing the mercapto compound at approximately room temperature with sodium hypochlorite in a quantity not substantially in excess of the stoichiometric equivalent required to remove one hydrogen from each molecule, and filtering off the product.

8. A process for preparing di(4-methyl thiazyl) disulphide which comprises oxidizing 2-mercapto 4-methyl thiazole in an aqueous medium containing alkali in a quantity insufficient to dissolve the mercapto compound, with an alkali metal hypochlorite in a quantity not substantially in excess of the stoichiometric equivalent required to remove one hydrogen from each molecule.

9. A process for preparing di(4-methyl thiazyl) disulphide which comprises suspending 2-mercapto 4-methyl thiazole in water maintained alkaline by a sodium salt of a weak acid in a quantity insufficient to dissolve the mercapto compound, oxidizing the mercapto compound at approximately room temperature with sodium hypochlorite in a quantity not substantially in excess of the stoichiometric equivalent required to remove one hydrogen from each molecule, and filtering off the product.

ROGER A. MATHES.